(12) United States Patent
Zhou

(10) Patent No.: US 9,435,941 B2
(45) Date of Patent: Sep. 6, 2016

(54) BACKLIGHT MODULE AND FIXTURE THEREOF

(71) Applicant: Shenzhen China Star Optoelectronics Technology Co., Ltd., Shenzhen, Guangdong (CN)

(72) Inventor: Gege Zhou, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 335 days.

(21) Appl. No.: 13/979,648

(22) PCT Filed: Jun. 27, 2013

(86) PCT No.: PCT/CN2013/078170
§ 371 (c)(1),
(2) Date: Jul. 13, 2013

(87) PCT Pub. No.: WO2014/172998
PCT Pub. Date: Oct. 30, 2014

(65) Prior Publication Data
US 2014/0321161 A1    Oct. 30, 2014

(30) Foreign Application Priority Data

Apr. 25, 2013   (CN) .......................... 2013 1 0148334

(51) Int. Cl.
| | |
|---|---|
| *F21V 7/04* | (2006.01) |
| *G02F 1/1333* | (2006.01) |
| *F21V 8/00* | (2006.01) |

(52) U.S. Cl.
CPC .................................. *G02B 6/0091* (2013.01)

(58) Field of Classification Search
CPC  G02B 6/0081; G02B 6/0091; G02B 6/0083; F21V 15/01; F21V 23/003; B29D 11/00721; F21K 9/1355; H05K 2201/10106; H05K 1/189; H05K 5/0017; H05K 1/028; H05K 1/181; H05K 2201/10136; H05K 5/0217; H05K 5/03; H05K 5/0004; H05K 5/0208; H05K 5/04; H05K 5/0013; H05K 5/0034; H05K 5/0043; H05K 5/0204; H05K 5/0221; G02F 1/16; G02F 1/133308; G02F 2001/133314; G02F 2001/133317; G02F 2001/13332; G02F 2001/133328; G09F 13/222; G09F 13/18; H01L 23/02; H01L 27/15
USPC ........ 362/632; 349/58, 59–60; 361/257, 348
See application file for complete search history.

(56) References Cited

U.S. PATENT DOCUMENTS

2007/0171676 A1 *  7/2007 Chang ........................... 362/613
2009/0103001 A1 *  4/2009 Choi .................. G02F 1/133308
                                                                    349/58

(Continued)

FOREIGN PATENT DOCUMENTS

| CN | 102384442 A | 3/2012 | |
|---|---|---|---|
| CN | 102830544 A | * 12/2012 | ....... G02F 1/133308 |

(Continued)

OTHER PUBLICATIONS

Espacenet CN 102830544 A English translation.*

*Primary Examiner* — Jason Moon Han
*Assistant Examiner* — Omar Rojas Cadima
(74) *Attorney, Agent, or Firm* — Andrew C. Cheng

(57) ABSTRACT

The present invention is related to a technology of liquid crystal display, and specially to a fixture incorporated in a backlight module for the liquid crystal display. The fixture for backlight module comprises a backboard having a bottom board, a sidewall, and a bent portion. The sidewall has a first end and a second end, and the bottom board being interconnected with the first end. The bent portion is interconnected to the second end, and arranged on an outside of the sidewall, and creates an angle with respect to the sidewall. A plastic frame is defined with opening aligned and enveloped onto the bent portion so as to securely assemble the plastic frame to the backboard. The advanced and preferred interengagement between the backboard and the plastic frame can not only readily implement into the backlight module in which the light strip and backboard are made individually, but also can be fitted into the backlight module in which the backboar is integrally formed with driving circuit for light strip. The fixture can be readily facilitated by the existing technology and the assembly is easy while the overall configuration is robust and durable.

11 Claims, 3 Drawing Sheets

(56) References Cited

U.S. PATENT DOCUMENTS

2010/0149802 A1* 6/2010 Chang .......................... 362/235
2011/0122334 A1* 5/2011 Tang .............................. 349/58
2012/0236541 A1* 9/2012 Chen ........................... 362/97.2

FOREIGN PATENT DOCUMENTS

| CN | 102840518 A | 12/2012 |
| CN | 202675166 U | 1/2013 |
| CN | 103018960 A | 4/2013 |

* cited by examiner

BACKLIGHT MODULE AND FIXTURE THEREOF

FIELD OF THE INVENTION

The present invention relates to a technical field of liquid crystal display, and more particularly, to an improvement of a backlight module.

DESCRIPTION OF PRIOR ART

As shown in FIG. 1, a typical backlight module is shown and generally configured with a front frame 140, a light strip 130, an optical element layer 160, a panel 150, and a backboard 110 and a plastic frame 120. The backboard 110 is formed with a retainer 112, and an opening of the plastic frame 120 is aligned and engaged thereto. The plastic frame 120 is attached to the backboard 110. The light strip 130 is arranged onto another side of the backboard 110 opposite to the retainer 112. The optical element layer 160 is disposed onto the backboard 110 in sequence. A side of the front frame 140 abuts against to an external side of the plastic frame 120, and another side is seated onto the panel 150 so as to prevent the panel 150 from moving and escaping out therefrom. A driving circuit (not shown in Figure) is arranged onto a driving circuit board 131 of the light strip 130, and then the driving circuit board 131 is interconnected to the backboard 110. With this kind of design, a distance L1 measured from a surface of the light strip 130 to the external side of the 140 is comparably large, and this cannot satisfy the requirements of narrow bezel or thin bezel of the panel. In order to fulfill the purpose of narrow border of the panel, one alternative is to remove the backboard, and this arrangement will inevitable compromise the overall mechanic strength of the backlight module, and also generate some other problems. The other alternative includes narrowing the plastic frame, but this has its inherited limitation.

On the other hand, some of the skilled in the art provide an measurement by directly mounting the driving circuit of the light strip 130 onto a sidewall 112 of the backboard 110 so as to fulfill the requirement of narrow-border requirement. However, it can be readily appreciated that since the thickness of the driving circuit is very thin and is far thinner than the thickness of the driving circuit board. Accordingly, a distance L2 measured from the front surface of the light strip 130 to the external side of the front frame 140 is smaller than the L1 of the conventional design such as described above, i.e. an overall thickness of the driving circuit board is saved and the purpose of narrow-border is realized. Nevertheless, this arrangement making the fixing of the plastic frame and the backboard become difficult to facilitate.

This is because within the prior art backlight module, the retainer can be formed on the sidewall of the backboard, and the plastic frame can be defined with opening so as to engaged with the retainer, therefore, the engagement between the retainer and the opening will be strong enough to secure the plastic frame to the backboard. However, in the configuration of the backlight module of the liquid crystal display as disclosed in FIG. 2, because the driving circuit of the light strip 130 is mounted onto the sidewall 112 of the backboard 110, accordingly, the real estate of the sidewall 112 of the backboard 110 is now occupied by the driving circuit for the operation and driving of the LCD, there is no room for providing atitional retainer or screw holes to retain the plastic frame 120. As a result, the plastic frame 120 can only lean against to the backboard 110 during the assembling of the backlight module of the liquid crystal display. This design is comparably unstable, the functioning of the liquid crystal display can be easily affected.

SUMMARY OF THE INVENTION

In order to resolve the technical problem encountered by the prior art, the present invention provides a fixture for the backlight module, and a backlight module incorporated with such a fixture.

The fixture for backlight module comprises a backboard having a bottom board, a sidewall, and a bent portion. The sidewall has a first end and a second end, and the bottom board being interconnected with the first end. The bent portion is interconnected to the second end, and arranged on an outside of the sidewall, and creates an angle with respect to the sidewall. A plastic frame is defined with opening aligned and enveloped onto the bent portion so as to securely assemble the plastic frame to the backboard.

Preferably, wherein the bent portion, the sidewall and the bottom board are integrally formed together.

Wherein the sidewall is embedded with an integrally formed driving circuit used for driving an operation of a LED light source disposed within the sidewall.

The present invention further provides a backlight module configured with a front frame, a panel, a light strip, an optical element layer, wherein an fixture is incorporated, the fixture includes a backboard having a bottom board, a sidewall, and a bent portion, the sidewall having a first end and a second end, and the bottom board being interconnected with the first end. The bent portion is interconnected to the second end, and arranged on an outside of the sidewall, and creating an angle with respect to the sidewall. A plastic frame is defined with opening aligned and enveloped onto the bent portion so as to securely assemble the plastic frame to the backboard. The optical element layer is arranged onto the bottom board, and the light strip is arranged within the sidewall and facing to the optical element layer. The panel is disposed onto the plastic frame and with the front frame abutting against an external side of the plastic frame, and another side of the front frame abutting against to external side of the panel so as to retain the panel.

Preferably, wherein the bent portion, the sidewall and the bottom board are integrally formed together.

Preferably, wherein light strip includes an LED light source and a driving circuit, wherein the driving circuit is disposed onto the sidewall for driving an operation of a LED light source.

The present invention can be concluded with the following advantages. The fixture for the backlight module of the liquid crystal display is facilitated by providing a bent portion on the backboard so as to engage with an opening defined on the plastic frame. By this arrangement, formation of retainer on the backboard is advantageously avoided. The advanced and preferred interengagement between the backboard and the plastic frame can not only readily implement into the backlight module in which the light strip and backboard are made individually, but also can be fitted into the backlight module in which the backboar is integrally formed with driving circuit for light strip. The fixture can be readily facilitated by the existing technology and the assembly is easy while the overall configuration is robust and durable.

DETAILED DESCRIPTION OF PREFERRED EMBODIMENTS

Detailed description will be given herebelow in view of the preferred embodiments along with the accompanied drawings.

Embodiment I.

Figure 1:
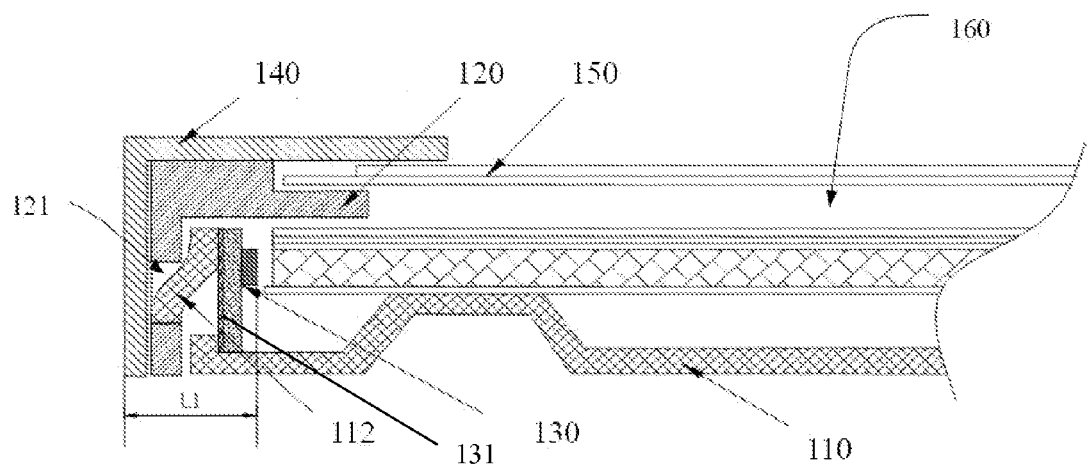
FIG. 1 is a configurational illustration of a prior art backlight module for liquid crystal display.
Figure 2:
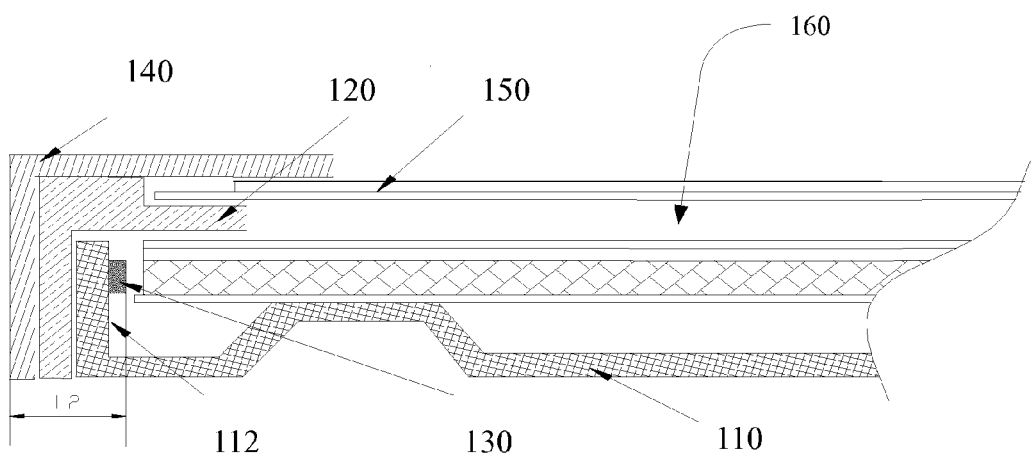
FIG. 2 is still a configurational illustration of the other prior art backlight module for liquid crystal display.
Figure 3A:
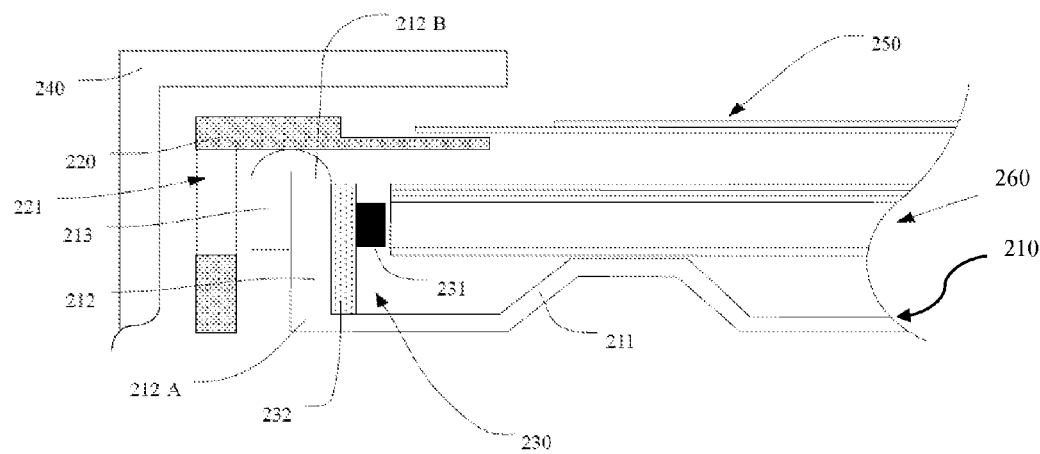
FIG. 3A is a configurational illustration of a backlight module for liquid crystal display made in accordance with a first embodiment of the present invention before it is assembled.

Referring to FIG. 3A, a backlight module for liquid crystal display in accordance with the present invention includes a light strip 230, an optical element layer 260, a front frame 240, and a fixture which includes a backboard 210 and a plastic frame 220.

Figure 4:
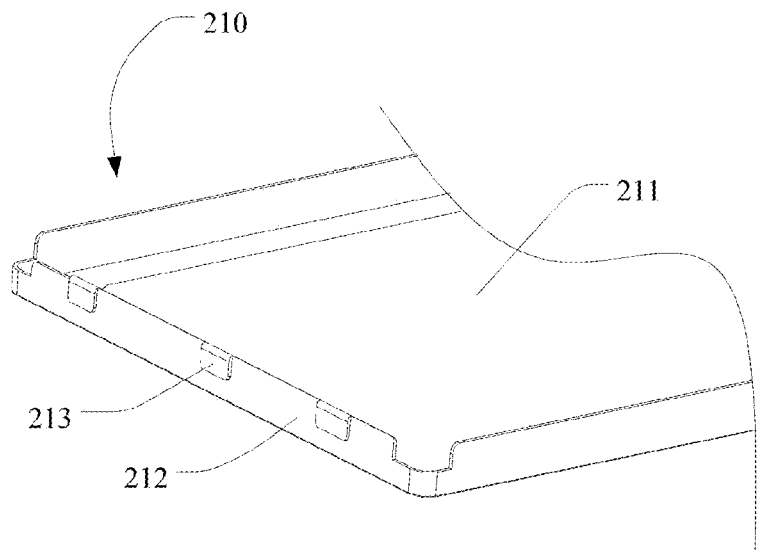
FIG. 4 is a configurational illustration of a backboard made in accordance with a first embodiment of the present invention.

Referring now along with FIG. 4, the backboard 201 includes a bottom board 211, a sidewall 212 and a bent portion 213. The sidewall 212 has a first end 212A, and a second end 212B. The first end 212A is interconnected with the bottom board 211, and the bent portion 213 is interconnected with the second end 212B and is disposed outside of the sidewall 212. Wherein the bent portion 213, the sidewall 212 and the bottom board 211 are integrally formed.

The plastic frame 220 is defined with an opening 221 which is aligned with the bent portion 213 which can be snugly received and retained within the opening 221. The interengagement between the opening 221 and the bent portion 213 makes a robust and durable assembly between the plastic frame 220 and the backboard 210.

Figure 3B:
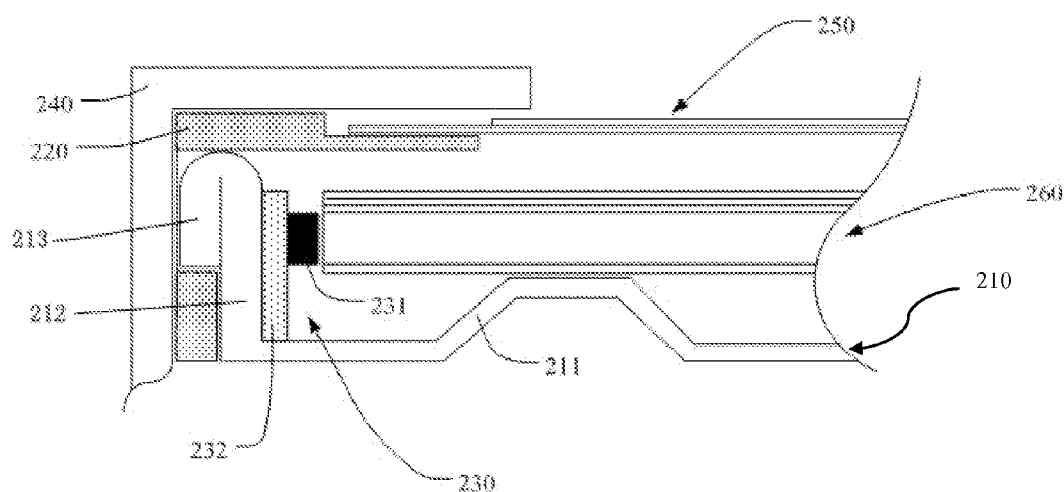
FIG. 3B is a configurational illustration of a backlight module for liquid crystal display made in accordance with a first embodiment of the present invention after it is assembled.

The bent portion 213 is bent toward the sidewall 212 such that the bent portion 213 creates an embossment located outside of the sidewall 212. The opening 221 of the plastic 220 is in aligned with the bent portion 213. In order to achieve the purpose of narrow-border, the bent portion 213 can tightly abut against the external surface of the sidewall 212, such as shown in FIGS. 3A or 3B. This configuration can readily use the interengagement between the opening 221 and the bent portion 213 to facilitate the assembling of the plastic frame 220 to the backboard 210.

The light strip 230 includes an LED light source 231 and a driving circuit board 232. The driving circuit board 232 is embedded with driving circuit for driving the operation of the LED light source 231. After the assembling, the overall configuration is illustrated in FIG. 3B. In assembling, the optical element layer 260 is mounted onto the bottom board 211. The light strip 230 is arranged inside of the sidewall 212 and facing the LED light source 231 and the optical element layer 260. Interconnection is made by the driving circuit board 232 and the sidewall 212. The panel 250 is disposed on top of the plastic frame 220, and finally, the front frame 240 is pressed onto the external side of the plastic frame 220, and the other side of the front frame 240 is seated onto the panel 250 to prevent it from escaping.

Preferably, wherein the backboard is made from plastic material.

Embodiment II

The difference of the second embodiment to the first embodiment s is that the driving circuit is directly disposed onto the backboard so as to facilitate the realization of the narrow-border. This arrangement can effectively resolve the problem of once the driving circuit is disposed onto the backboard, the plastic frame can be hardly positioned.

Figure 5:
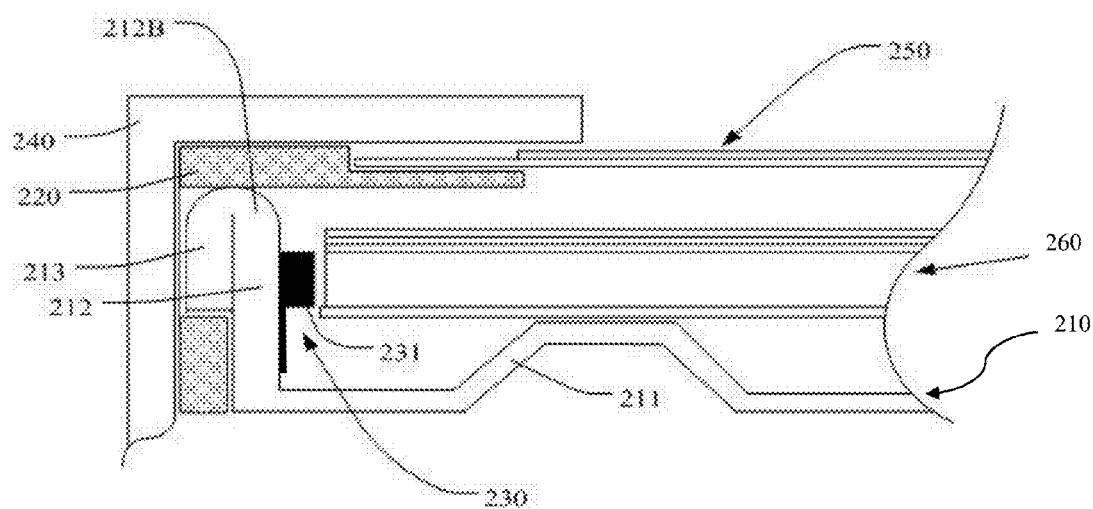
FIG. 5 is a configurational illustration of a backlight module for liquid crystal display made in accordance with a second embodiment of the present invention after it is assembled.

As shown in FIG. 5, the driving circuit of the light strip 230 is directly embedded onto the sidewall 212 of the backboard 210. Since the driving circuit can be made very thin, and makes only a naked portion for interconnection with the light strip 230. The inner side of the sidewall 212 can be arranged that only the LED light source 231 is naked to face the optical element layer 260 so as to reduce the overall thickness of the driving circuit board that is required in Embodiment I. Since the sidewall 212 is occupied with driving circuit and there is no room for formation of openings, accordingly, the bent portion 213 interconnected to the second end 212B of the sidewall 212 can be used to position the plastic frame 220. The configuration of the fixture for the bent portion 213 and the plastic frame 220 can be referred to Embodiment I. By the provision of the present invention, a stable, reliable, and durable interengagement between the plastic frame and the backboard can be realized and fulfilled.

The invention claimed is:

1. A fixture for backlight module, comprising:
    a backboard having a bottom board, a sidewall, and a bent portion, the sidewall having a first end and a second end, and the bottom board being interconnected with the first end, the second end of the sidewall being opposite to the bottom board;
    the bent portion being interconnected to the second end, and arranged on an outside of the sidewall and tightly abutting against an external surface of the sidewall, and creating an angle with respect to the sidewall; and
    a plastic frame supported on the second end of the sidewall and defined with an opening aligned and enveloped onto the bent portion so as to securely assemble the plastic frame to the backboard, wherein the bent portion has a top end interconnected to the second end of the sidewall and an opposite bottom end and the bent portion is received in the opening with the top end and the bottom end thereof respectively in abutting engagement with opposite sides of the opening of the plastic frame and wherein an internal side surface of the plastic frame is located next to the external surface of the sidewall against which the bent portion tightly abuts such that an outside surface of the bent portion is located inboard of an opposite, external side surface of the plastic frame without projection beyond the external side surface of the plastic frame.

2. The fixture as recited in claim 1, wherein the bent portion, the sidewall and the bottom board are integrally formed together.

3. The fixture as recited in claim 1, wherein the sidewall is embedded with an integrally formed driving circuit used for driving an operation of a LED light source disposed within the sidewall.

4. The fixture as recited in claim 1, wherein the backboard is made from metal.

5. The fixture as recited in claim 1, wherein the backboard is made from plastic material.

6. A backlight module configured with a front frame, a panel, a light strip, an optical element layer, wherein an fixture is incorporated, the fixture including:

a backboard having a bottom board, a sidewall, and a bent portion, the sidewall having a first end and a second end, and the bottom board being interconnected with the first end, the second end of the sidewall being opposite to the bottom board;

the bent portion being interconnected to the second end, and arranged on an outside of the sidewall and tightly abutting against an external surface of the sidewall, and creating an angle with respect to the sidewall;

a plastic frame supported on the second end of the sidewall and defined with an opening aligned and enveloped onto the bent portion so as to securely assemble the plastic frame to the backboard, wherein the bent portion has a top end interconnected to the second end of the sidewall and an opposite bottom end and the bent portion is received in the opening with the top end and the bottom end thereof respectively in abutting engagement with opposite sides of the opening of the plastic frame and wherein an internal side surface of the plastic frame is located next to the external surface of the sidewall against which the bent portion tightly abuts such that an outside surface of the bent portion is located inboard of an opposite, external side surface of the plastic frame without projection beyond the external side surface of the plastic frame; and the optical element layer being arranged onto the bottom board, the light strip being arranged within the sidewall and facing to the optical element layer, the panel being disposed onto the plastic frame with the front frame abutting against the external side surface of the plastic frame to completely conceal the bent portion in the opening of the plastic frame, and another side of the front frame abutting against to external side of the panel so as to retain the panel.

7. The backlight module as recited in claim 6, wherein the bent portion, the sidewall and the bottom board are integrally formed together.

8. The backlight module as recited in claim 6, wherein light strip includes an LED light source and a driving circuit, wherein the driving circuit is disposed onto the sidewall for driving an operation of a LED light source.

9. The backlight module as recited in claim 6, wherein the driving circuit is directly formed onto the sidewall.

10. The backlight module as recited in claim 6, wherein the sidewall is embedded with an integrally formed driving circuit used for driving an operation of a LED light source disposed within the sidewall.

11. The backlight module as recited in claim 6, wherein the backboard is made from plastic material.

* * * * *